Patented Sept. 7, 1948

2,448,978

UNITED STATES PATENT OFFICE 2,448,978

MIXTURE OF HYDROLYZED ETHYLENE-VINYL ESTER COPOLYMER AND N-SUBSTITUTED POLYAMIDE

Fred Wayne Hoover, Wilmington, Del., assignor to E. I. du Pont de Nemours & Company, Wilmington, Del., a corporation of Delaware No Drawing. Application December 14, 1944, Serial No. 568,195

12 Claims. (Cl. 260—45.2)

This invention relates to polymeric materials and more particularly to compositions comprising N-alkoxymethyl polyamides and hydrolyzed copolymers of a vinyl ester with another polymerizable organic compound.

This invention has as an object the preparation of new and improved polymeric compositions. A further object is the production of compositions having high softening temperatures, insolubility in water and organic solvents, improved pliability and other desirable properties. Further objects will appear hereinafter.

The above objects are accomplished by heating an intimate mixture of an N-alkoxymethyl polyamide with a hydrolyzed copolymer of a vinyl ester of an organic monocarboxylic acid with other polymerizable compounds containing a single ethylenic double bond.

The N-alkoxymethyl polyamides which are employed in the preparation of the compositions of this invention are obtained by the reaction of synthetic linear polyamides, which have hydrogen bearing carbonamide groups and which are described in United States Patents 2,071,250, 2,071,253, and 2,130,948, with formaldehyde and alcohol in the presence of an oxygen-containing acid. The linear polyamides described in the mentioned patents are high molecular weight polymers, namely, those having an intrinsic viscosity of at least 0.4 and can be prepared by several methods, for example, by self-polymerization of a monoaminomonocarboxylic acid, by reacting in substantially equimolecular proportions a dibasic acid with a diamine or with a monoaminomonohydric alcohol, it being understood that these reactants can be replaced by their equivalent amide-forming derivatives. These linear polyamides also include polyester-amides, for example, those obtained by admixture with other linear polymer-forming reactants, such as glycol-dibasic acid mixtures, or mixtures of hydroxy acids with the previously mentioned polyamide-forming reactants. In these synthetic linear polycarbonamides the amide groups are an integral part of the main polymer chain and the average number of carbons in the segments of the chain separating the amide groups is at least two.

The N-alkoxymethyl polyamides obtained by reaction of the above described linear polyamides with formaldehyde and an alcohol in the presence of an oxygen-containing acid (organic acids such as formic or acetic, or weak inorganic acids such as those of phosphorous having an ionization constant less than two) have the hydrogen bearing carbonamide group replaced by the group —CH₂OR in which R is the radical of an alcohol from which a hydroxyl has been removed, and particularly a hydrocarbon radical such as methyl. The reaction can be carried out by heating at about 60° C. a solution of the initial polyamide, for example, polyhexamethylene adipamide, in solution in formic acid with a solution of paraformaldehyde in methanol, and isolating the product. The methanol can be replaced by ethyl, propyl, butyl, furfuryl, allyl and other alcohols mentioned in application Serial No. 539,195, filed June 7, 1944, by T. L. Cairns, now Patent No. 2,430,860, November 18, 1947, which describes the preparation of these polymers in more detail. In these N-alkoxymethyl polyamides carbonamide groups

of the initial polyamide are converted to the groups

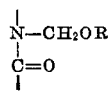

in which R is the radical of an alcohol from which a hydroxyl group has been removed.

The hydrolyzed vinyl ester interpolymers are those obtained by hydrolyzing in known manner the copolymerization product of a vinyl ester of an organic acid with another polymerizable monoethylenically unsaturated compound by which is meant compounds of this kind that are polymerizable to high molecular weight compounds as distinguished from dimers or trimers. These polymers, which are illustrated by the hydrolyzed ethylene-vinyl ester interpolymers, are best prepared by copolymerizing ethylene and an organic vinyl ester, for example, vinyl acetate, at temperatures of about 100° C. or less and at ethylene pressures preferably below 500 atmospheres in the presence of a peroxygen catalyst. The hydrolysis, which is intended also to refer to alcoholysis since the product obtained is the same, is preferably carried out by dissolving the interpolymer in an alcohol such as methanol or ethanol, or in a mixture of an alcohol and a hydrocarbon such as toluene, and then treating with a suitable hydrolyzing agent or catalyst such as an alkali hydroxide or a mineral acid. The hydrolysis may be partial or complete, depending upon the conditions employed. The preparation of hydrolyzed copolymers of ethylene and a vinyl ester of an organic acid are more completely described in the copending application of J. R. Roland, Serial No. 446,114, filed June 6, 1942. Hydrolyzed ethylene-vinyl ester interpolymers having an ethylene-vinyl alcohol molar ratio of from 15:1 to 1:15 are especially useful when mixed with the N-alkoxymethyl polyamides to give polymeric compositions of this invention which have a particularly useful combination of properties.

The compositions of this invention are obtained by first mixing or blending the above described hydrolyzed vinyl ester copolymers and the N-alkoxymethyl polyamides by several methods. This composition, for example, can be obtained in the form of films by mixing solutions of the two components followed by removal of the solvents. Milling on a rubber mill at temperatures from about 50° C. to 200° C. of suitable amounts of these polymers is a particularly convenient method to obtain compatible and thoroughly mixed compositions. These compositions are then baked with or without added acid catalyst, to give the insoluble or cured product.

This invention is further illustrated by the following examples in which parts are given by weight.

Example I

Ten parts of a substantially completely hydrolyzed ethylene-vinyl acetate copolymer having a mol ratio of 3:1 of ethylene to vinyl acetate was added to a solution containing 40 parts by weight each of benzene and methanol. After standing overnight the swollen polymer was milled on a rubber mill at 90° C. to 100° C. for fifteen minutes with 1 part of N-methoxy-methyl polyhexamethylene adipamide which had approximately 50% of the hydrogen on the carbonamide groups replaced by methoxy-methyl groups. The blended polymer was then dried in a vacuum desiccator for approximately 16 hours and pressed on a heated hydraulic press at 125° C. at a pressure of approximately 500 lbs. per sq. in. to give clear pliable films.

Some of the films thus produced were further subjected to reaction by heat treatment in the presence of an acid catalyst. The resulting polymeric composition had higher softening temperatures and other improved properties, for example, increased solvent resistance. The acid-modified compositions were prepared by treating the films as obtained above in an aqueous 10% maleic acid solution at 25° C. for 15 hours followed by heating the film for 1 hour at 100° C. The following table shows the difference in properties of films obtained before and after the acidic-baking treatment.

| Property | Air Dried Films | Baked Films |
| --- | --- | --- |
| Tensile Strength/Elongation, lbs. per sq. in./per cent | 2510/319 | 4237/111 |
| Pliability, 10⁻⁴×in.²/lbs | 10 | 36 |
| Bending Modulus, lbs./in.² | 0.06×10⁶ | 0.06×10⁶ |
| Zero Tensile Strength, ° C | 111 | above 300 |
| Cold Crack Temperature, ° C | −35 | −45 |

Example II

A warm solution comprising 5 parts of a substantially completely hydrolyzed ethylene-vinyl acetate (of molar ratio of approximately 3:1 of ethylene-vinyl acetate), 5 parts of N-methoxymethyl polyhexamethylene adipamide having approximately 50% of the hydrogen of the carbonamide group replaced by methoxymethyl groups, 24 parts of n-butanol, 14.1 parts of toluene, 5.1 parts of n-propanol and 0.057 part of 85% phosphoric acid was spread onto a warm glass plate by means of a doctor knife and then heated at 70° C. for approximately 17 hours. The film which was obtained by this procedure was clear, pliable, elastic, had good water resistance and a high zero tensile strength temperature.

A similar film prepared without using any acid was found to possess good clarity and pliability but was less elastic and had lower water resistance. The properties of these two films are summarized in the following table.

| Property | Films prepared in the absence of acid | Films prepared in the presence of acid |
| --- | --- | --- |
| Tensile in lbs./in.²: | | |
| Dry | 2,400 | 2,400 |
| Wet | 700 | 1,700 |
| Elongation (lbs./in.²): | | |
| Dry | 500 | 200 |
| Wet | 80 | 170 |
| Elastic Recovery From Break, per cent | Slight | 93 |
| Pliability (in.²/lb.×10⁻⁶) | 70 | 100 |
| Zero Strength at Temperature in ° C | 115 | above 200 |

In the above tables, the softening points or zero tensile strength temperatures of the cured polymeric composition, that is, the polymeric composition after heat and/or acid treatment, is much greater than the corresponding temperatures of the individual polymers. For example, the hydrolyzed ethylene-vinyl acetate copolymer has a zero strength temperature of about 110° C. while the N-alkoxymethyl polyamide used in the above examples has a softening temperature of about 100° C.

Compatible blends are readily formed between the N-alkoxymethyl polyamides and any hydroxylated copolymer which contains hydroxyl groups on at least 5% of the carbon atoms of the polymeric chain. It is preferred that the hydrolyzed interpolymers of this invention have hydroxyl groups on more than 5% and less than 45% of the carbon atoms in the polymeric chain of the hydroxylated interpolymer. Hydroxylated interpolymers outside this range have less compatibility and are difficult to incorporate with N-alkoxymethyl polyamides.

Although the mixtures of N-alkoxymethyl polyamides and the hydrolyzed copolymer, for example, the hydrolyzed ethylene-vinyl acetate interpolymers, are useful to some extent without further treatment for the preparation of homogeneous molded articles, coated fabrics, etc., a baking or curing treatment in the presence of acid catalysts yields products of particular value by reason of further improvement in elasticity, solvent-, water-, and heat-resistance.

The formation of insoluble and high softening polymeric compositions of this invention is probably due to reaction between the hydroxyls of the copolymer and the —CH₂OR group of the N-alkoxymethyl polyamide. The rate of reaction between the hydroxyl groups of the interpolymers and the alkoxy groups of the modified polyamide is increased at elevated temperatures and especially when an acid is present, to give a polymeric composition which consists of some of the alkoxy groups of the modified polyamide replaced by the hydroxylated interpolymer. Such a reaction gives cross-linked compositions. An acid or a compound which releases acid at the temperatures employed is preferably used to increase the rate of this reaction between the hydroxylated interpolymer and the N-alkoxymethyl polyamide. Acids particularly useful are those having an ionization constant greater than $1\times10^{-5}$ including organic acids such as oxalic, acetic, maleic, and toluene sulfonic acid. Small amounts of mineral acids such as phosphoric may also be used. Strong acids such as sulfuric and hydrochloric can be used but should be present in small amounts to avoid degradation of the polymeric material.

The acid catalyst when used can vary from a fraction of a percent to 5% or more as based on the weight of N-alkoxymethyl polyamide present in the composition. When no catalyst is employed, a longer period of time and higher temperatures are necessary for insolubilization and increased heat resistance of the polymeric composition. The amount of catalyst used is dependent upon its acidity under the conditions employed. The temperature used in the curing or heat-treatment of the acidulated polymeric blend is usually in the range of 60° to 250° C. preferably 100°–150° C. although temperatures as low as room temperature or as high as 325° C. may be used. With higher temperatures, the time of curing is decreased.

The amount of the N-alkoxymethyl polyamide and the hydroxylated copolymer can vary within wide limits, both being present in substantial amounts. Products of modified properties may be obtained when as little as 1 part of one of the components is employed with as much as 200 parts of the other. Thus, for example, when 1 part of N-alkoxymethyl polyamide is mixed with 200 parts of hydrolyzed ethylene-vinyl acetate interpolymer and the resulting material heated, the resulting polymeric composition has greater water resistance, solvent resistance and higher softening temperatures than the hydrolyzed ethylene-vinyl acetate interpolymers itself. However, the more useful range of blends of the polymers is obtained when a ratio of between 1 part to 25 parts to 25 to 1 of each of the polymers is employed.

Any hydrolyzed copolymer of a vinyl ester with another polymerizable compond having monoethylenic unsaturation may be employed in the manner described in the foregoing examples to give the polymeric compositions of this invention. Vinyl esters useful in the practice of this invention are vinyl esters of organic monocarboxylic acids free from ethylenic unsaturation and preferably free from tertiary substituents on the alpha carbon. In addition to vinyl acetate, such vinyl esters as vinyl formate, vinyl propionate, vinyl oleate, vinyl furoate, vinyl benzoate, vinyl cyclohexane carboxylate, etc., can be used in the preparation of the copolymer.

Polymerizable compounds which possess a single ethylenic double bond can be interpolymerized with a vinyl ester to give the copolymers which are then hydrolyzed. Such polymerizable compounds include the vinyl and vinylidene compounds, that is, open chain monoethylenically unsaturated compounds having a terminal methylene group, such as, methyl acrylate, methyl methacrylate, acrylonitrile, methacrylonitrile, methacrylamide, vinyl chloride, vinyl bromide, vinyl fluoride, vinylidene halides, ethylene propylene, isobutylene and methyl vinyl ketone. Other polymerizable monoethylenically unsaturated compounds which can be copolymerized with a vinyl carboxylic ester include fumaric esters, for example, dimethyl fumarate, trichloroethylene, and tetrafluoroethylene.

Part of the hydroxyl groups of the hydrolyzed copolymer can be converted to other groups, such as for example, acetals or ketals, which can be formed by treating the hydrolyzed interpolymer with an aldehyde such as formaldehyde or butyraldehyde under mild conditions to form a formal or butyral with some of the hydroxyl groups not otherwise combined. It is unnecessary to completely hydrolyze the interpolymers, for example, the ethylene-vinyl ester interpolymers, and polymers containing both hydroxyl and ester groups are useful as components of the previously described composition.

Although any N-alkoxymethyl polyamide can be employed in the formation of the blended polymer composition comprising this invention, it is preferred to use N-alkoxymethyl polyamides which have at least 5% of the hydrogen of the hydrogen bearing carbonamide groups replaced by alkoxymethyl radicals. The R substituent in the —N(CH$_2$OR)— group is preferably a hydrocarbon, for example, methyl, ethyl, butyl, propyl, cyclohexyl, allyl, stearyl, etc., although other groups may be present. Thus in addition to the N-methoxymethyl polyhexamethylene adipamide employed in the examples, other alkoxymethyl polyamides include N-butoxymethyl polyhexamethylene adipamide and N-octyloxymethyl polyhexamethylene adipamide, or similar alkoxymethyl derivatives of polyhexamethylene sebacamide, poly-6-aminocaproamide, interpolymers of these materials or interpolymers containing other groups such as ester groups can be employed. Polyamides which contain N-methylol groups can also be employed in this invention.

The blended cured polymers of this invention have increased solvent- and water-resistance, and in general greater toughnes and hardness than the individual polymers. The compositions are considerably more pliable than the hydrolyzed interpolymer. This combination of properties of the blended and cured composition is of value in applications where the individual polymers cannot be used. The toughness, hardness, increased water-, solvent-, and temperature-resistance are especially important in coatings and metal finishes.

These compositions are useful in the manufacture of a wide variety of products and particularly in the preparation of molded articles, elastic films and fibers, coated fabrics, insulation, finishes for metals, wood or fabrics, self-supported films, adhesives, and for similar uses.

As many apparently widely different embodiments of this invention may be made without departing from the spirit and scope thereof, it is to be understood that I do not limit myself to the specific embodiments thereof except as defined in the appended claims.

I claim:

1. A composition of matter which on heating is rendered insoluble in organic solvents, said composition consisting of a homogeneous blend comprising an intimate mixture of an N-substituted polyamide and a hydrolyzed ethylene/vinyl ester copolymer in which the vinyl ester is that of a saturated primary monocarboxylic acid, said hydrolyzed copolymer having hydroxyl groups on from 5% to 45% of the carbon atoms in the copolymer chain, said N-substituted polyamide and hydrolyzed copolymer being present in the proportion by weight of from 1:200 parts of the N-substituted polyamide to 200:1 parts of said copolymer, said N-substituted polyamide being a synthetic polymeric linear polycarbonamide of intrinsic viscosity of at least 0.4 which contains amide groups as an integral part of the polymer chain, and in which at least 5% of said amide groups have been converted to groups of the formula

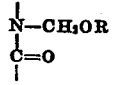

wherein R is the radical of a monohydric alcohol from which a hydroxyl has been removed, the average number of carbon atoms in the segments of the chain separating the amide groups in said N-substituted polyamide being at least two.

2. The composition set forth in claim 1 in which said N-substituted polyamide and hydrolyzed copolymer are present in the proportion by weight of from 1:25 parts of the N-substituted polyamide to 25:1 parts of said copolymer.

3. A composition of matter which on heating is rendered insoluble in organic solvents, said composition consisting of a homogeneous blend comprising an intimate mixture of acid catalyst having an ionization constant greater than $1 \times 10^{-5}$, an N-substituted polyamide and a hydrolyzed ethylene/vinyl ester copolymer in which the vinyl ester is that of a saturated primary monocarboxylic acid, said hydrolyzed copolymer having hydroxyl groups on from 5% to 45% of the carbon atoms in the copolymer chain, said N-substituted polyamide and hydrolyzed copolymer being present in the proportion by weight of from 1:200 parts of the N-substituted polyamide to 200:1 parts of said copolymer, said N-substituted polyamide being a synthetic polymeric linear polycarbonamide of intrinsic viscosity of at least 0.4 which contains amide groups as an integral part of the polymer chain, and in which at least 5% of said amide groups have been converted to groups of the formula

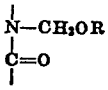

wherein R is the radical of monohydric alcohol from which a hydroxyl has been removed, the average number of carbon atoms in the segments of the chain separating the amide groups in said N-substituted polyamide being at least two.

4. The composition set forth in claim 3 in which said N-substituted polyamide and hydrolyzed copolymer are present in the proportion of weight of from 1:25 parts of the N-substituted polyamide to 25:1 parts of said copolymer.

5. The composition set forth in claim 3 in which the ester is vinyl acetate.

6. A product which is insoluble in organic solvents and which is obtained by heating the composition set forth in claim 1.

7. A process which comprises heating at 60° to 250° C. an N-substituted polyamide with a hydrolyzed ethylene/vinyl ester copolymer in the proportion by weight of from 1:200 parts of the N-substituted polyamide to 200:1 parts of said hydrolyzed copolymer, said hydrolyzed copolymer being one in which the vinyl ester is that of a primary monocarboxylic acid and which has hydroxyl groups on from 5% to 45% of the carbon atoms in the copolymer chain, said N-substituted polyamide being a synthetic polymeric linear polycarbonamide of intrinsic viscosity of at least 0.4 which contains amide groups as an integral part of the polymer chain, and in which at least 5% of the said amide groups have been converted to groups of the formula

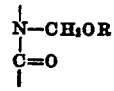

wherein R is the radical of a monohydric alcohol from which a hydroxyl has been removed, the average number of carbon atoms in the segments of the chain separating the amide groups in said N-substituted polyamide at least two.

8. A process which comprises heating at 60 to 250° C. an intimate mixture of an N-substituted polyamide and a hydrolyzed ethylene/vinyl acetate copolymer in the proportion by weight of from 1:200 parts of the N-substituted polyamide to 200:1 parts of said hydrolyzed copolymer, said hydrolyzed copolymer having hydroxyl groups on from 5% to 45% of the carbon atoms in the copolymer chain, said N-substituted polyamide being a synthetic polymeric linear polycarbonamide of intrinsic viscosity of at least 0.4 which contains amide groups as an integral part of the polymer chain, and in which at least 5% of the said amide groups have been converted to groups of the formula

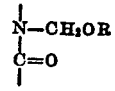

wherein R is the radical of a monohydric alcohol from which a hydroxyl has been removed, the average number of carbon atoms in the segments of the chain separating the amide groups in said N-substituted polyamide being at least two.

9. The process set forth in claim 8 in which said N-substituted polyamide and hydrolyzed copolymer are present in the proportion by weight of from 1:25 parts of the N-substituted polyamide to 25:1 parts of said copolymer.

10. A process which comprises heating at 60 to 250° C. in the presence of an acid catalyst having an ionization constant greater than $1 \times 10^{-5}$, an N-substituted polyamide and a hydrolyzed ethylene/vinyl ester copolymer in the proportion by weight of from 1:200 parts of the N-substituted polyamide to 200:1 parts of said hydrolyzed copolymer, said hydrolyzed copolymer being one in which the vinyl ester is that of a primary monocarboxylic acid and which has hydroxyl groups on from 5% to 45% of the carbon atoms in the copolymer chain, said N-substituted polyamide being a synthetic polymeric linear polycarbonamide of intrinsic viscosity of at least 0.4 which contains amide groups as an integral part of the polymer chain, and in which at least 5% of said amide groups have been converted to groups of the formula

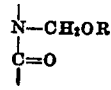

wherein R is the radical of a monohydric alcohol from which a hydroxyl has been removed, the average number of carbon atoms in the segments of the chain separating the amide groups in said N-substituted polyamide being at least two.

11. The process set forth in claim 10 in which said N-substituted polyamide and hydrolyzed copolymer are present in the proportion by weight of from 1:25 parts of the N-substituted polyamide to 25:1 parts of said copolymer.

12. The process set forth in claim 10 in which said N-substituted polyamide is N-methoxymethyl polyamide.

FRED WAYNE HOOVER.

REFERENCES CITED

The following references are of record in the file of this patent:

UNITED STATES PATENTS

| Number | Name | Date |
|---|---|---|
| 2,169,250 | Izard | Aug. 15, 1939 |
| 2,200,429 | Perrin et al. | May 14, 1940 |
| 2,244,184 | Austin et al. | June 3, 1941 |
| 2,275,008 | Coffman | Mar. 3, 1942 |
| 2,322,888 | Schwartz et al. | June 29, 1943 |
| 2,338,252 | Marberg et al. | Jan. 4, 1944 |
| 2,393,972 | Cairns | Feb. 5, 1946 |
| 2,403,464 | Smith | July 9, 1946 |
| 2,403,465 | Pease | July 9, 1946 |

FOREIGN PATENTS

| Number | Country | Date |
|---|---|---|
| 562,091 | Great Britain | June 19, 1944 |